United States Patent
Johnson et al.

(10) Patent No.: US 9,529,010 B2
(45) Date of Patent: Dec. 27, 2016

(54) FLIGHT DECK DISPLAY SYSTEMS AND METHODS FOR VISUALLY INDICATING LOW SPEED CHANGE CONDITIONS DURING TAKEOFF AND LANDING

(71) Applicant: HONEYWELL INTERNATIONAL INC., Morristown, NJ (US)

(72) Inventors: Steve Johnson, North Bend, WA (US); Yasuo Ishihara, Kirkland, WA (US); Kevin J Conner, Kent, WA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 277 days.

(21) Appl. No.: 13/919,431

(22) Filed: Jun. 17, 2013

(65) Prior Publication Data

US 2014/0368359 A1    Dec. 18, 2014

(51) Int. Cl.

| | |
|---|---|
| G08B 21/00 | (2006.01) |
| G08B 5/00 | (2006.01) |
| G01P 1/10 | (2006.01) |
| G01P 5/00 | (2006.01) |
| G01C 23/00 | (2006.01) |

(52) U.S. Cl.
CPC .................. *G01P 1/10* (2013.01); *G01C 23/00* (2013.01); *G01P 5/00* (2013.01)

(58) Field of Classification Search
CPC ........ G08G 5/025; G08G 5/0065; G08G 5/02; G01C 23/00; G01C 23/005; G01P 1/10; G01P 5/00; G01S 13/913; G05D 1/0083; G05D 1/0202; G05D 1/0204
USPC ................ 340/945, 947–948, 951, 953–956, 340/959–963, 969
See application file for complete search history.

(56) References Cited

U.S. PATENT DOCUMENTS

| | | | |
|---|---|---|---|
| 3,048,329 A | 8/1962 | Berggren | |
| 3,128,445 A * | 4/1964 | Hosford | ........................ 340/959 |
| 3,230,507 A * | 1/1966 | Holt | .......................... G01S 1/02 |
| | | | 340/932 |
| 3,230,527 A * | 1/1966 | Wehde | ................ B64C 29/0091 |
| | | | 342/105 |
| 3,897,683 A * | 8/1975 | Hansen | ....................... 73/178 T |
| 4,030,065 A * | 6/1977 | Bateman | ....................... 340/970 |
| 4,122,522 A * | 10/1978 | Smith | ............................. 701/15 |

(Continued)

FOREIGN PATENT DOCUMENTS

GB    2375748 A    11/2002

OTHER PUBLICATIONS

EP Extended Search Report for Application No. 14170849.5 dated Oct. 9, 2014.

*Primary Examiner* — Hai Phan
*Assistant Examiner* — Son M Tang
(74) *Attorney, Agent, or Firm* — Lorenz & Kopf, LLP

(57) ABSTRACT

Embodiments of a flight deck display system deployed onboard an aircraft are provided, as are embodiments of a method carried-out by a flight deck display system. In one embodiment, the flight deck display system includes a cockpit display device and a controller. The controller is configured to: (i) establish the speed trend of the aircraft over a predetermined time period; (ii) generate a primary flight display on the cockpit display device including a speed trend vector graphic representative of the established speed trend; and (iii) alter the appearance of the speed trend vector graphic in a first predetermined manner if a low speed change condition is detected during at least one of aircraft takeoff and landing.

20 Claims, 2 Drawing Sheets

(56) References Cited

U.S. PATENT DOCUMENTS

| | | | |
|---|---|---|---|
| 4,251,868 A | 2/1981 | Aron et al. | |
| 4,368,517 A * | 1/1983 | Lovering | 701/16 |
| 4,608,863 A | 9/1986 | Cooper | |
| 4,638,437 A | 1/1987 | Cleary et al. | |
| 4,837,695 A | 6/1989 | Baldwin | |
| 4,980,833 A * | 12/1990 | Milligan et al. | 701/15 |
| 5,103,224 A | 4/1992 | Arad | |
| 5,289,185 A * | 2/1994 | Ramier et al. | 340/971 |
| 5,353,022 A * | 10/1994 | Middleton et al. | 340/959 |
| 5,420,582 A * | 5/1995 | Kubbat et al. | 340/974 |
| 5,499,025 A | 3/1996 | Middleton et al. | |
| 5,798,713 A * | 8/1998 | Viebahn et al. | 340/974 |
| 6,175,315 B1 | 1/2001 | Millard et al. | |
| 6,441,751 B2 | 8/2002 | Berlioz et al. | |
| 6,686,851 B1 * | 2/2004 | Gordon | G01C 23/005 340/970 |
| 6,720,891 B2 * | 4/2004 | Chen et al. | 340/969 |
| 6,822,624 B2 | 11/2004 | Naimer et al. | |
| 6,870,490 B2 | 3/2005 | Sherry et al. | |
| 6,978,205 B2 | 12/2005 | Ryan et al. | |
| 6,995,690 B1 * | 2/2006 | Chen | G01C 23/00 340/961 |
| 7,014,146 B2 * | 3/2006 | Villaume et al. | 244/111 |
| 7,062,364 B2 | 6/2006 | Maris | |
| 7,106,217 B2 * | 9/2006 | Judge et al. | 340/973 |
| 7,158,052 B2 * | 1/2007 | Zammit-Mangion | G05D 1/0083 340/959 |
| 7,205,907 B2 | 4/2007 | Naimer et al. | |
| 7,436,323 B2 | 10/2008 | Ishihara et al. | |
| 8,014,910 B2 * | 9/2011 | Mathieu | G05D 1/0083 244/12.4 |
| 8,209,122 B2 | 6/2012 | Nichols et al. | |
| 8,527,119 B2 * | 9/2013 | Chaptal | G05D 1/0661 701/15 |
| 8,630,752 B2 * | 1/2014 | Gurusamy et al. | 701/7 |
| 8,665,121 B2 * | 3/2014 | Shavit | 340/978 |
| 2003/0016144 A1 * | 1/2003 | Pattisapu | 340/945 |
| 2003/0132860 A1 * | 7/2003 | Feyereisen et al. | 340/973 |
| 2003/0137434 A1 * | 7/2003 | Godard et al. | 340/973 |
| 2003/0193410 A1 * | 10/2003 | Chen | G01C 23/005 340/971 |
| 2003/0206119 A1 * | 11/2003 | Riley | 340/963 |
| 2004/0075586 A1 | 4/2004 | Glover | |
| 2004/0210355 A1 * | 10/2004 | Gaidelis et al. | 701/4 |
| 2005/0206533 A1 * | 9/2005 | Rogers et al. | 340/979 |
| 2005/0237226 A1 * | 10/2005 | Judge et al. | 340/946 |
| 2008/0215198 A1 | 9/2008 | Richards | |
| 2008/0249675 A1 * | 10/2008 | Goodman | B64C 25/426 701/16 |
| 2009/0140885 A1 * | 6/2009 | Rogers et al. | 340/977 |
| 2009/0207048 A1 * | 8/2009 | He et al. | 340/973 |
| 2010/0036552 A1 * | 2/2010 | Pepitone et al. | 701/18 |
| 2011/0118909 A1 | 5/2011 | Ishihara et al. | |
| 2011/0320070 A1 * | 12/2011 | Ishihara | G05D 1/0676 701/16 |
| 2012/0153074 A1 * | 6/2012 | Nannoni | G05D 1/0858 244/17.13 |
| 2012/0323475 A1 * | 12/2012 | Roman et al. | 701/120 |
| 2013/0009792 A1 * | 1/2013 | Shafaat | G08G 5/0008 340/979 |
| 2013/0238171 A1 * | 9/2013 | Muller | G01C 23/00 701/3 |
| 2013/0253738 A1 * | 9/2013 | Fucke | 701/14 |
| 2014/0052314 A1 * | 2/2014 | Ostrom et al. | 701/7 |
| 2014/0225753 A1 * | 8/2014 | Conrardy | G08G 5/0047 340/972 |
| 2014/0283728 A1 * | 9/2014 | Wang | B63G 11/00 114/261 |
| 2014/0368359 A1 * | 12/2014 | Johnson et al. | 340/969 |
| 2014/0375478 A1 * | 12/2014 | Horne et al. | 340/959 |
| 2016/0179327 A1 * | 6/2016 | Zammit-Mangion | G01C 23/00 701/7 |

* cited by examiner

FLIGHT DECK DISPLAY SYSTEMS AND METHODS FOR VISUALLY INDICATING LOW SPEED CHANGE CONDITIONS DURING TAKEOFF AND LANDING

TECHNICAL FIELD

The following disclosure relates generally to flight deck display systems and, more particularly, to embodiments of systems and methods for generating a cockpit display, such as a primary fight display, including visual queues indicative of low acceleration conditions during aircraft takeoff and/or low deceleration conditions during aircraft landing.

BACKGROUND

While rare, runway overrun events continue to occur during aircraft takeoff and landing; the terms "aircraft takeoff" and "aircraft landing," as appearing herein, encompassing aircraft takeoffs and landings that are successfully completed, as well as attempted takeoffs and landings that are rejected or abandoned before completion. The continued occurrence of runway overrun events is reflective of the many different factors that can influence whether a particular takeoff or landing attempt is successful. Such factors include runway length, aircraft gross or all-up weight, aircraft engine performance, runway surface conditions, atmospheric conditions, and wind conditions. Many of the foregoing factors are dynamic and can change significantly in relatively short periods of time. Several of the previously-listed factors, such as runway surface conditions and crosswind conditions, can also vary over the length of the runway. Considerable efforts have been expended in the development of algorithms for establishing reliable acceleration schedules (in the case of aircraft takeoff) and deceleration schedules (in the case of aircraft landing) utilizing such factors. However, at present, there exist few, if any, flight deck display systems that provide readily comprehendible visual queues correlating the actual speed change of an aircraft to the target acceleration or deceleration at a given juncture during aircraft takeoff or landing, respectively.

It is thus desirable to provide embodiments of a flight deck display system for generating visual feedback indicating the occurrence of low acceleration conditions during aircraft takeoff and/or the occurrence of low deceleration conditions during aircraft landing. Ideally, such a display system would provide such visual feedback as intuitive and readily comprehendible queues, which appear within the pilot's natural scan pattern and which can be readily integrated into the symbology of existing cockpit displays. It would also be desirable to provide embodiments of a method for providing visual feedback indicating low acceleration and/or deceleration conditions during aircraft takeoff and/or landing. Other desirable features and characteristics of the present invention will become apparent from the subsequent Detailed Description and the appended Claims, taken in conjunction with the accompanying Drawings and the foregoing Background.

BRIEF SUMMARY

Embodiments of a flight deck display system deployed onboard an aircraft are provided. In one embodiment, the flight deck display system includes a cockpit display device and a controller, which is operably coupled to the cockpit display device. The controller is configured to: (i) establish the speed trend of the aircraft over a predetermined time period; (ii) generate a primary flight display on the cockpit display device including a Speed Trend Vector ("STV") graphic representative of the established speed trend; and (iii) alter the appearance of the STV graphic in a first predetermined manner if a low speed change condition is detected during at least one of aircraft takeoff and landing.

Further provided are embodiments of a method carried-out by a fight deck display system including a cockpit display device and deployed onboard an aircraft. In one embodiment, the method includes generating on the cockpit display device a graphical display, such as a Primary Flight Display ("PFD"), including an STV graphic representative of a established speed trend. The appearance of the STV graphic is visually altered in response to determining that the speed change of the aircraft is less than a threshold value, such as an acceleration or deceleration threshold, during takeoff and/or landing of the aircraft.

BRIEF DESCRIPTION OF THE DRAWINGS

At least one example of the present invention will hereinafter be described in conjunction with the following figures, wherein like numerals denote like elements, and.

Figure 1:
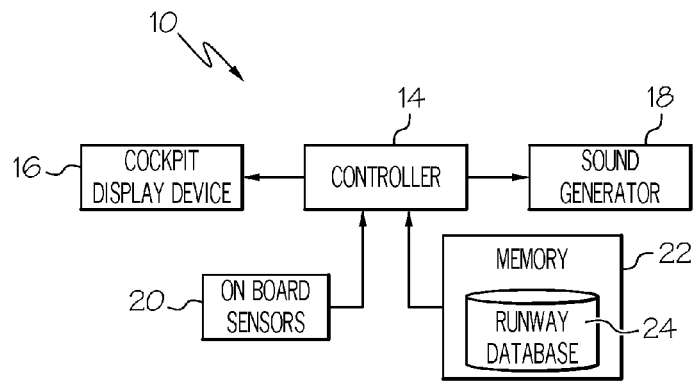
FIG. 1 is a block diagram of a flight deck display system deployed onboard a host aircraft and illustrated in accordance with an exemplary and non-limiting embodiment of the present invention.

For simplicity and clarity of illustration, the drawing figures illustrate the general manner of construction, and descriptions and details of well-known features and techniques may be omitted to avoid unnecessarily obscuring the invention. Additionally, elements in the drawings figures are not necessarily drawn to scale. For example, the dimensions of some of the elements or regions in the figures may be exaggerated relative to other elements or regions to help improve understanding of embodiments of the invention.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. Terms such as "comprise," "include," "have," and variations thereof are utilized herein to denote non-exclusive inclusions. Such terms may thus be utilized in describing processes, articles, apparatuses, and the like that include one or more named steps or elements, but may further include additional unnamed steps or elements. The term "pilot," as appearing herein, encompasses all members of a flight crew. The terms "host aircraft" or "ownship aircraft" are utilized to refer to an aircraft on which the below-described flight deck display system is deployed. The term "Air Traffic Controller," and the corresponding acronym "ATC," generally refer to any control authority or authorities located remotely relative to the host or ownship aircraft and serving as recognized authorities in air traffic management.

FIG. 1 is a block diagram of a flight deck display system 10 deployed onboard a host aircraft, as illustrated in accordance with an exemplary and non-limiting embodiment. Display system 10 provides visual feedback should the speed change of the aircraft become undesirably low (behind schedule) during aircraft takeoff and/or landing; it again being noted that the term "aircraft takeoff" is defined to encompass both successful takeoffs and unsuccessful (rejected) takeoff attempts, and the term "aircraft landing" is defined to encompass both successful landings and unsuccessful (rejected) landing attempts. In the case of aircraft takeoff, specifically, display system 10 may provide visual feedback on a cockpit display indicating if and when the current acceleration of the aircraft falls below one or more acceleration thresholds at a given juncture during takeoff Display system 10 may provide such visual feedback by changing the color or otherwise altering the appearance of an STV (Speed Trend Indicator) graphic included within a PFD (Primary Flight Display) generated by display system 10. As will be described more fully below, the STV graphic is a symbol or graphical element produced on a cockpit display indicating the direction and magnitude of the speed trend of the host aircraft over a predetermined time period of, for example several seconds. By visually altering the appearance of the STV graphic, display system 10 provides intuitive visual queues indicating that the aircraft acceleration is undesirably low at the present phase of takeoff. This, in turn, notifies the pilot to increase thrust or consider abandonment of the current takeoff attempt. Additionally or alternatively, display system 10 may provide visual feedback on a cockpit display indicating if and when the current deceleration of the aircraft falls below one or more deceleration thresholds during aircraft landing. Again, this is preferably accomplished by changing the color of or otherwise visually altering an STV graphic included within the PFD. In this latter case, display system 10 may provide one or more visual queues should the deceleration of the aircraft become undesirably low at a particular juncture during landing thereby notifying the pilot that he or she should likely further decrease the aircraft speed or consider abandoning the landing the landing attempt.

In the exemplary embodiment shown in FIG. 1, flight deck display system 10 includes the following components, each of which may be comprised of multiple devices, systems, or elements: (i) a controller 14; (ii) a cockpit display device 16; (iii) a sound generator 18; (iv) onboard sensors 20; and (vi) memory 22. Controller 14 includes at least first and second inputs, which are operatively coupled to onboard sensors 20 and memory 22, respectively. Controller 14 further includes at least first and second outputs, which are operatively coupled to cockpit display device 16 and to sound generator 18, respectively. In further embodiments wherein flight deck display system 10 does not include sound generator 18, controller 14 may include only a single output operatively coupled to cockpit display device 12. Display device 12 may comprise any monitor or image-generating device suitable for producing a PFD or other visual display including an STV graphic of the type described herein. Controller 14 may comprise, or be associated with, any suitable number of individual microprocessors, flight control computers, navigational equipment, memories (including or in addition to memory 22), power supplies, storage devices, interface cards, and other standard components known in the art. In this respect, the controller 14 may include or cooperate with any number of software programs (e.g., avionics display programs) or instructions designed to carry out the various methods, process tasks, calculations, and control/display functions described below.

Although illustrated as a separate block in FIG. 1, memory 22 may be integrated into controller 14 in certain embodiments. Memory 22 contains a runway database 24 including information pertaining to runways located at various airports. Such information may include, but is not necessarily limited to, runway length. In one embodiment, database 24 assumes the form of an Enhanced Ground Proximity Warning System ("EGPWS") runway database. In some cases, memory 22 may also store predetermined speed change (acceleration and/or deceleration) thresholds associated with the different runways stored in database 24. Alternatively, memory 22 may store one or more generic speed change thresholds utilized across all takeoff and/or landing procedures regardless of the particular runway involved. If stored in memory 22, such predetermined speed change thresholds may be utilized to determine when visual and/or audible alerts should be generated during a particular takeoff or landing procedures based the acceleration or deceleration, respectively, of the aircraft equipped with display system 10, as described more fully below in conjunction with FIG. 3. To this end, onboard sensors 20 monitor aircraft speed and relay the detected aircraft speed to controller 14, preferably in real-time. Onboard sensors 20 may also detect and relate additional information to controller 14 regarding the current flight parameters of the aircraft (e.g., the current altitude at which the aircraft is flying, the pitch and roll angle of the aircraft, and so on), which controller 14 may further utilize in generating PFD 30 described below in conjunction with FIG. 2.

Figure 2:
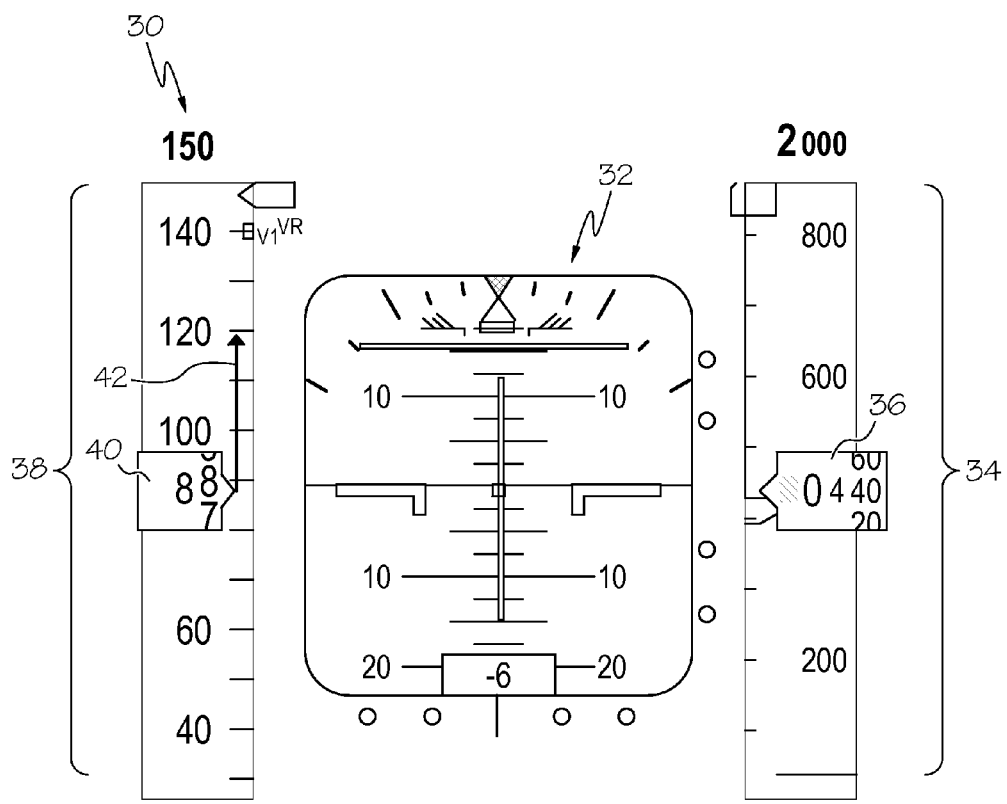
FIG. 2 is a screenshot of an exemplary PFD (Primary Flight Display) that may be generated by the flight deck display system shown in FIG. 1 including an STV (Speed Trend Vector) graphic, the appearance of which may be altered in response to the detection of low acceleration conditions during aircraft takeoff and/or the detection of low deceleration conditions during aircraft landing.

Turning now to FIG. 2, there is shown an exemplary PFD 30 that may be generated on cockpit display device 16 by controller 14 during operation of flight deck display system 10 (FIG. 1). As can be seen, PFD 30 contains various different graphical elements and symbols visually relating the current flight parameters of aircraft on which display system 10 is deployed. The graphic elements shown in FIG. 2 are generally well-known within the avionics industry and will thus not be described in detail herein. However, for completeness, it is briefly noted that the illustrated PFD 30 includes an attitude direction indicator ("ADI") window 32, which visually indicates the pitch and roll attitude of the aircraft relative to the horizon. PFD 30 further includes a vertical altitude scale or tape 34, which is located to the right of ADI window 32. Altitude tape 34 includes a precision readout window 36, which provides an enlarged readout of the altitude at which the aircraft is presently flying. A vertical airspeed scale or tape 38 is further produced to the left of ADI window 32. Airspeed tape 38 includes a precision readout window 40, which provides an enlarged textual readout of the current airspeed of the aircraft.

With continued reference to FIG. 2, an STV graphic 42 is produced proximate airspeed tape 38 and, specifically, adjacent precision readout window 40. STV graphic 42 indicates the speed trend of the host aircraft over a predetermined time period, as calculated by controller 14 of display system 10 utilizing airspeed data provided by onboard sensors 20 (FIG. 1). In the illustrated example, STV graphic 42 is generated as a vertically-extending arrow overlaid on or superimposed over airspeed tape 38, which extends from precision readout window 40 to the calculated future speed of the host aircraft after the predetermined time period has elapsed (assuming the speed change of the aircraft to remain constant). In the exemplary scenario illustrated FIG. 2, STV graphic 42 indicates that aircraft is currently traveling at ~88 knots and is accelerating at a rate that will bring the airspeed of the aircraft to ~120 knots after the predetermined time period (e.g., ten seconds) has elapsed, if the current rate of acceleration is maintained. In certain cases, STV graphic 42 may not be generated in instances when the aircraft speed is held constant and the host aircraft is neither accelerating nor decelerating. However, in preferred embodiments of the present invention, STV graphic 42 is produced even when the aircraft speed is constant or near constant to retain the ability to visually notify the pilot of low speed change conditions occurring during aircraft takeoff and/or landing through alterations in the appearance of STV graphic 42, as described more fully below.

Figure 3:
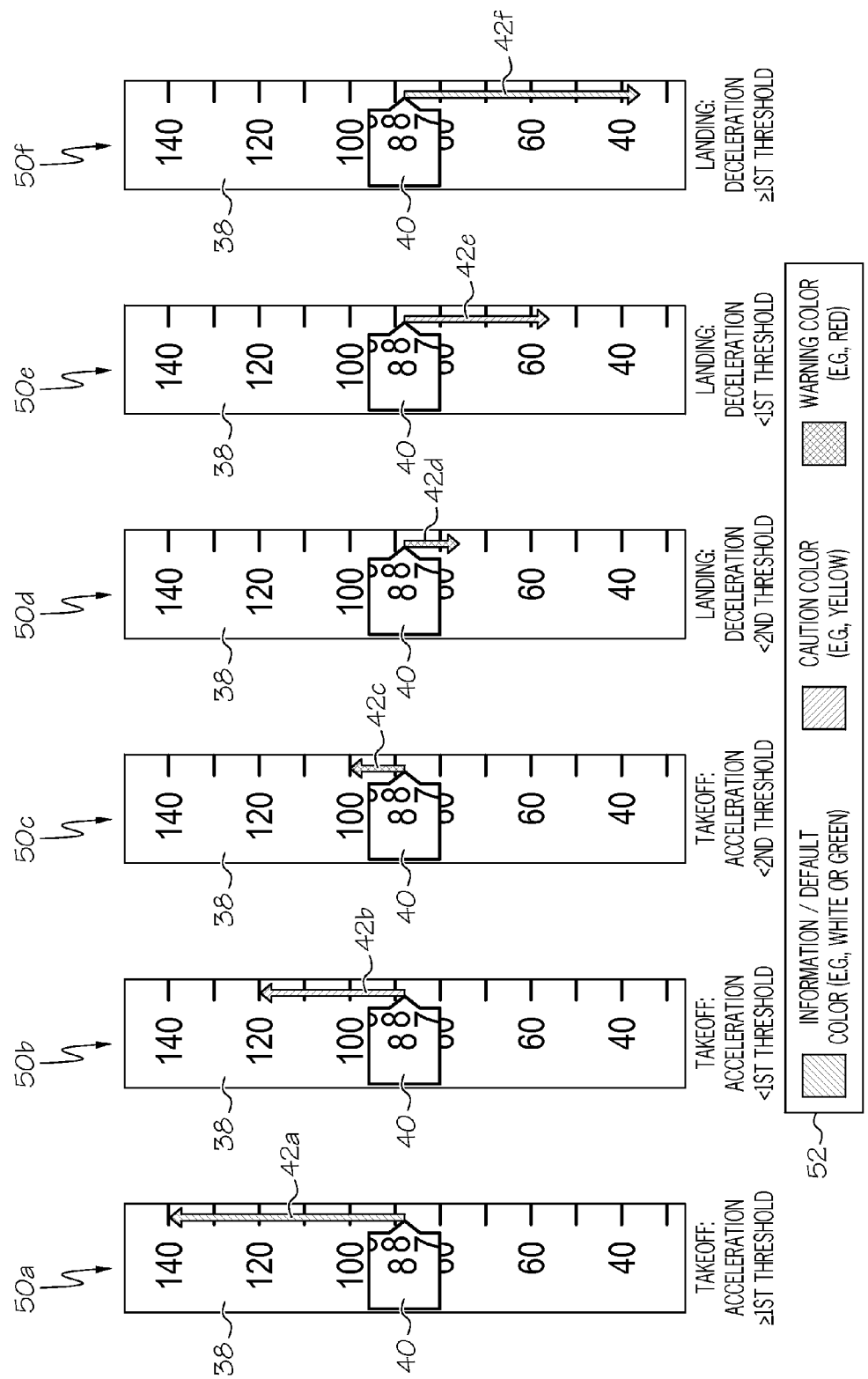
FIG. 3 illustrates one manner in which the flight deck display system shown in FIG. 1 may alter the appearance of the STV graphic shown in FIG. 2 in accordance with a pre-established color coding scheme in several different takeoff and landing scenarios.

FIG. 3 illustrates a selected portion 50 of PFD 30 (FIG. 2) as generated by controller 14 of display system 10 (FIG. 1) in six different exemplary scenarios 50(a)-(f) that may occur during takeoff and landing of the host aircraft. The illustrated portion 50 of PFD 30 shown in FIG. 3 encompasses airspeed tape 38, precision readout window 40, and STV graphic 42. As will become apparent from the following description, scenarios 50(a) and 50(f) illustrate PFD 30 under baseline conditions; that is, when acceleration or deceleration is generally on schedule during aircraft takeoff or landing, respectively. In contrast, scenarios 50(b)-(e) illustrate several possible manners in which controller 14 of display system 10 (FIG. 1) may alter the appearance of STV graphic 42 to produce visual queues notifying the pilot of low acceleration conditions occurring during aircraft takeoff and low deceleration conditions occurring during aircraft landing. The three scenarios 50(a)-(c) appearing on the left hand side of FIG. 3 depict STV graphic 42 when the acceleration of the aircraft varies during takeoff, while the three scenarios 50(d)-(f) appearing on the right hand side of FIG. 3 depict STV graphic 42 when the deceleration of the aircraft varies during aircraft landing. These scenarios are each described, in turn, below.

During or prior to each of the scenarios 50(a)-50(f), controller 14 of display system 10 (FIG. 1) establishes at least one speed change threshold; that is, at least one acceleration threshold in the case of the takeoff and at least one deceleration threshold in the case of the landing. Controller 14 may establish any particular number of speed change thresholds and generate various different levels of visual alerts on PFD 30 during aircraft takeoff and/or landing. For example, in a simplified embodiment, controller 14 may establish a single speed change threshold and generate a single visual alert should the speed change threshold be surpassed during takeoff/or landing. This notwithstanding, it is preferred that controller 14 establishes first and second speed change thresholds for each takeoff and/or landing procedure. The first speed change threshold (referred to below as the "speed change caution threshold") may be utilized to determine when a low level caution alert should be generated during aircraft takeoff and/or landing. The second speed change threshold (referred to below as the "speed change warning threshold") may be utilized to determined when a high level warning alert should be generated during aircraft takeoff and/or landing.

Controller 14 may establish the speed change thresholds by recalling predetermined threshold values stored within memory 22 (FIG. 1). In this case, the predetermined speed change thresholds may be associated with a particular runway on which the aircraft has been cleared for takeoff or landing. Alternatively, as noted above, controller 14 may recall from memory 22 one or more generic speed change thresholds utilized for takeoff and/or landing procedures performed on all runways. As a still further alternative, controller 14 may determine the predetermined speed change thresholds utilizing a look-up table correlating different threshold values with different runway lengths and potentially other factors, such as aircraft class or weight. In further embodiments, the speed change thresholds may be dynamic and continually updated by controller 14 at a predetermined refresh rate throughout a given takeoff or landing procedure. In this latter case, controller 14 may first establish a target speed change at the present juncture during takeoff or landing. To determine the speed change caution threshold, controller 14 may subtract form the target speed a relatively small value (e.g., a relatively small percentage of the calculated target speed change) to account for minor to moderate deviations from the target speed change to determine the caution threshold value. Similarly, to determine the speed change warning threshold, controller 14 may subtract from target speed change a relatively large value (e.g., a relatively large percentage of the target acceleration) representing the maximum acceptable deviation from the target acceleration. Notably, the target speed change may be time and position dependent; that is, the target speed change at a particular moment in time may depend upon the position of the aircraft relative to the departure end of the runway at which the aircraft has been cleared to use for takeoff or landing. The target speed change may be determined utilizing a look-up table or a predetermined speed change schedule, which correlates the desired speed of the aircraft with the remaining length of runway. In addition to aircraft speed and position with respect to the runway, various other factors that may be considered in calculating the target acceleration. Such additional factors may include, but are not limited to, aircraft engine performance, surface conditions on the runway, atmospheric conditions, wind conditions, and the like.

The foregoing discussion notwithstanding, the particular manner in which the acceleration thresholds are established will vary amongst different embodiments of display system 10, and embodiments of the present invention are by no means limited to a particular manner in which the acceleration thresholds are derived unless otherwise expressly stated. By way of non-limiting example, additional description of algorithms suitable for calculating target acceleration may be found in the following document, the entire contents of which are hereby incorporated by reference: U.S. application Ser. No. 12/621,842, entitled "SYSTEMS AND METHODS OF DETECTING LOW TAKEOFF PERFORMANCE DUE TO INCORRECT WEIGHT INFORMATION," filed Nov. 19, 2009, and assigned to assignee of the present Application.

Within continued reference to FIG. 3, takeoff scenarios 50(a)-50(c) will now be described. In the first takeoff scenario 50(a) illustrated in the leftmost column in FIG. 3, the upward direction and relatively long length of STV graphic 42(a) indicates that the host or ownship aircraft is currently accelerating at a relatively rapid rate. The current acceleration of the aircraft is thus greater than or equivalent to the speed change (acceleration) caution threshold in this scenario. By comparison, in the second scenario 50(b), the acceleration of the aircraft has decreased, as indicated by the reduced length of STV graphic 42(b). Consequently, in this second scenario, the current aircraft acceleration has fallen below the acceleration caution threshold. In response, controller 14 of display system 10 has altered the appearance of STV graphic 42(b) in a first predetermined manner to produce a low level caution alert on PFD 30. For example, controller 14 may alter the appearance of STV graphic 42 through a change in color. In particular, as indicated in FIG.

3 the different cross-hatching of STV graphic 42(*a*) and 42(*b*) in scenarios 50(*a*) and 50(*b*), STV graphic 42(*a*) may be generated in an informational or default color in scenario 50(*a*); while STV graphic 42(*a*) may be generated in a caution color in scenario 50(*b*). The particular colors selected as the default and caution colors will vary amongst different embodiments. In one embodiment, and as indicated in FIG. 3 by key 52, the default color may be white or green, while the caution color may be yellow. By changing the appearance of STV graphic 42(*b*) in this manner, flight deck display system 10 provides an intuitive visual queue directly in the pilot's natural scan pattern indicating that the acceleration of the aircraft is moderately below the target aircraft acceleration at the current juncture during takeoff and that a moderate increase in thrust may be warranted.

In the final takeoff scenario 50(*c*) illustrated in FIG. 3, the aircraft is accelerating at a relatively slow rate, as indicated by the relatively short length of STV graphic 42(*c*). Thus, in this case, the aircraft acceleration has fallen below the second speed change (acceleration) threshold. As a result, controller 14 of display system 10 (FIG. 1) has now altered the appearance of STV graphic 42 in second predetermined manner to produce a high level warning alert on PFD 30. As before, the alteration in the appearance of STV graphic 42(*c*) is preferably implemented, at least in part, as a change in the color of STV graphic 42(*c*). In particular, controller 13 may now drive cockpit display device 16 (FIG. 1) to generate STV graphic 42(*c*) in a predetermined warning color. For example, as indicated in FIG. 3 by key 52, the predetermined warning color may be red; however, the warning color will vary depending upon the particular color coding scheme employed. Once again, this provides a prominent visual notification directly within the pilot's scan pattern indicating that the current aircraft acceleration is well-below the target acceleration at the present juncture during the takeoff procedure. As a result, a pilot viewing PFD 30 (FIG. 2) can quickly ascertain that a significant increase in thrust may be warranted or, instead, that rejection of the current takeoff attempt may be appropriate.

Controller 14 may alter the appearance of STV graphic 42 to indicate the occurrence of low speed change (deceleration) condition during aircraft landing in essentially the same manner as controller 14 alters the appearance of STV graphic 42 to indicate the occurrence of low speed change (acceleration) conditions during aircraft takeoff. This may be appreciated by referring to landing scenarios 50(*d*)-50(*f*) appearing in the right hand side of FIG. 3. Referring first to landing scenario 50(*f*), the aircraft is decelerating at a relatively rapid rate (indicated by the relatively long length and downward direction of STV graphic 42(*f*)). Thus, in this scenario, the deceleration of the aircraft is greater than or equal to the speed change (deceleration) caution threshold. In contrast, in scenario 50(*e*), aircraft deceleration has decreased by a moderate amount and thus fallen below the deceleration caution deceleration threshold, but remains above the deceleration warning threshold. In response, controller 14 has altered the appearance of STV graphic 42(*e*) in a first predetermined manner by, for example, changing the color of STV graphic 42(*e*) from the default color (e.g., white or green) to a predetermined caution color (e.g., yellow). Lastly, in scenario 50(*d*), the deceleration of the aircraft has fallen below the speed change (deceleration) warning threshold. Accordingly, controller 14 has alerted the appearance of STV graphic 42(*f*) in a second predetermined manner, namely, by changing the color of STV graphic 42(*f*) to the predetermined warning color (e.g., red).

In contrast to a system wherein display of the Speed Trend Vector graphic is suppressed under zero or nominal speed change conditions, controller 14 of flight deck display system 10 is preferably configured to generate STV graphic 42 on PFD 30 (FIG. 2) even under zero or nominal speed change conditions to retain the ability to generate the visual alerts indicative of low speed change conditions during aircraft takeoff and/or landing. Consider, for example, a scenario wherein aircraft speed remained constant (no acceleration or deceleration). During a takeoff procedure, controller 14 may still generate STV graphic 42 to have a fixed minimal length and to point in an upward direction (similar to STV graphic 42(*c*) shown in FIG. 3), while varying the color of STV graphic 42 in accordance with a predetermined color coding scheme to provide caution and/or warning alerts indicative of low acceleration conditions as previously described. Conversely, during a landing procedure, controller 14 may generate STV graphic 42 to have a fixed minimal length and point in a downward direction (similar to STV graphic 42(*d*) shown in FIG. 3), while varying the color of STV graphic 42 to provide caution and/or warning alerts indicative of low deceleration conditions as previously described.

While, in the foregoing example, the color of STV graphic 42 was varied to indicate the occurrence of low speed change conditions during aircraft takeoff and/or landing, controller 14 may alter the appearance of STV graphic 42 in other manners, as well. Such alternative changes in the appearance of STV graphic 42 may be implemented in addition to or in lieu of changes in color. For example, to draw attention to STV graphic 42 when the first (caution) acceleration or deceleration threshold is surpassed and/or when the second (warning) acceleration or deceleration threshold is surpassed, controller 14 may cause STV graphic 42 to flash or otherwise animate STV graphic 42 in some manner. Similarly, in embodiments wherein STV graphic 42 is generated as an arrow superimposed over airspeed tape 38 shown in FIGS. 2 and 3, the width of STV graphic 42 may be enlarged when the first and/or second acceleration and deceleration thresholds are surpassed. Alternatively, in embodiments wherein STV graphic 42 is generated as a marker, such a triangular pointer symbol positioned adjacent airspeed tape 38, STV graphic 42 may be scaled up or enlarged when the first and/or second acceleration and deceleration thresholds are surpassed. Additionally, haptic, audible, or other non-visual feedback may also be generated by display system 10 (FIG. 1) to supplement the visual queues generated on PFD 30 (FIG. 2) during low speed change conditions occurring during aircraft takeoff and/or landing. For example, controller 14 of display system 10 (FIG. 1) may drive sound generator 18 to produce audible alerts (e.g., caution and/or warning alerts) when low acceleration conditions are detected during aircraft takeoff and/or when low deceleration conditions are detected during aircraft landing. The audible alerts may be, for example, prerecorded or computer-generated aural messages stating that the speed change of the aircraft is behind schedule for the current takeoff and/or landing procedure.

The foregoing has thus provided embodiments of a flight deck display system for generating visual feedback indicating the occurrence of low acceleration conditions during aircraft takeoff and/or low deceleration conditions during aircraft landing. Notably, the above-described flight deck display system provides such visual feedback as intuitive and readily comprehendible queues, which appear within the pilot's natural scan pattern and which are easily integrated into the symbology of existing cockpit displays. In particular, in preferred embodiments, the flight deck display system changes the color of a STV (Speed Trend Vector) graphic appearing on a primary flight display from a pre-established default color to a caution color when the speed change of the aircraft becomes moderately low during aircraft takeoff or landing and to a warning color when the speed change of the aircraft becomes significantly low during aircraft takeoff or landing. In this manner, additional pertinent information can be conveyed to the pilot utilizing the STV graphic and intuitively correlating the current speed change of the aircraft to a desired or target speed change during aircraft takeoff and landing.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A flight deck display system deployed onboard an aircraft, the flight deck display system comprising:
   a cockpit display device;
   a controller operatively coupled to the cockpit display device and configured to:
      establish the speed trend of the aircraft over a predetermined time period;
      generate a Primary Flight Display ("PFD") on the cockpit display device including a speed trend vector graphic representative of the established speed trend when the speed of the aircraft varies over the predetermined time period; and
      alter the appearance of the speed trend vector graphic in a first predetermined manner if a low speed change condition is detected during at least one of aircraft takeoff and landing;
   wherein the controller produces the speed trend vector graphic to have a fixed minimal length when the aircraft speed remains constant over the predetermined time period to retain the ability to generate a visual alert of the low speed change condition by altering the appearance of the speed trend vector graphic.

2. The flight deck display system of claim 1 wherein the controller is further configured to:
   establish a first speed change threshold; and
   alter the appearance of the speed trend vector graphic in a first predetermined manner if the speed of the aircraft falls below the first speed change threshold during at least one of aircraft takeoff and landing.

3. The flight deck display system of claim 2 wherein the first speed change threshold is a speed change caution threshold, and wherein the controller is configured to change the color of the speed trend vector graphic to a predetermined caution color if the speed of the aircraft falls below the first speed change threshold during at least one of aircraft takeoff and landing.

4. The flight deck display system of claim 3 wherein the controller is further configured to:
   establish a speed change warning threshold; and
   change the color of the speed trend vector graphic to a predetermined warning color if the speed of the aircraft falls below the speed change warning threshold during at least one of aircraft takeoff and landing.

5. The flight deck display system of claim 2 wherein the first speed change threshold is a speed change warning threshold, and wherein the controller is configured to change the color of the speed trend vector graphic to a predetermined warning color if the speed of the aircraft falls below the first speed change threshold during at least one of aircraft takeoff and landing.

6. The flight deck display system of claim 1 wherein the speed trend vector graphic comprises an arrow.

7. The flight deck display system of claim 1 further comprising a sound generator coupled to the controller, and wherein the controller is further reconfigured to cause the sound generator to generate an audible alert if a low speed change condition is detected during at least one of aircraft takeoff and landing.

8. The flight deck display system of claim 7 wherein the audible alert comprises an aural messages stating that the speed change of the aircraft is behind schedule for the current takeoff and/or landing procedure.

9. The flight deck display system of claim 1 further comprising a memory, the controller operably coupled to the memory and further configured to:
   recall a first speed change threshold from the memory prior to at least one of takeoff and/or landing; and
   alter the appearance of the speed trend vector graphic in a first predetermined manner if the speed of the aircraft falls below the first speed change threshold during at least one of aircraft takeoff and landing.

10. The flight deck display system of claim 1 further comprising a memory storing a runway database, the controller operably coupled to the memory and configured to:
    establish a first speed change threshold prior to at least one of takeoff and/or landing, the controller establishing the first speed change threshold based at least partially upon the length of a cleared for use by the aircraft, as indicated by the runway database; and
    alter the appearance of the speed trend vector graphic in a first predetermined manner if the speed of the aircraft falls below the first speed change threshold during at least one of aircraft takeoff and landing.

11. A flight deck display system deployed onboard an aircraft, the flight deck display system comprising:
    a cockpit display device;
    a controller operatively coupled to the cockpit display device and configured to:
       establish the speed trend of the aircraft over a predetermined time period;
       generate a primary flight display on the cockpit display device including a speed trend vector graphic representative of the established speed trend when the speed of the aircraft varies over the predetermined time period;
       during takeoff of the aircraft from a runway, determine whether the acceleration of the aircraft is less than a first acceleration threshold based, at least in part, on the relative position of the aircraft to the end of the designated runway; and
       alter the appearance of the speed trend vector graphic in a first predetermined manner if the acceleration of the aircraft is less than the first acceleration threshold;
    wherein the controller generates the speed trend vector graphic to have a fixed minimal length and to generally point in an upward direction when the aircraft speed remains substantially constant over the predetermined time period.

12. The flight deck display system of claim 11 wherein the controller is configured to change the color of the speed trend vector graphic to a predetermined caution color if the acceleration of the aircraft is less than the first acceleration threshold.

13. The flight deck display system of claim 11 wherein the controller is further configured to alter the appearance of the speed trend vector graphic in a second predetermined manner if the acceleration of the aircraft is less than a second acceleration threshold.

14. The flight deck display system of claim 13 wherein the controller is configured to change the color of the speed trend vector graphic to a predetermined warning color if the acceleration of the aircraft is less than the second acceleration threshold.

15. A method carried-out by a fight deck display system including a cockpit display device and deployed onboard an aircraft, the method comprising:
generating on the cockpit display device a graphical display including a speed trend vector graphic representative of an established speed trend of the aircraft;
establishing a first deceleration threshold at one or more junctures during landing of the aircraft; and
visually altering the appearance of the speed trend vector graphic in a first predetermined manner if the deceleration of the aircraft falls below the first deceleration threshold during landing of the aircraft.

16. The method of claim 15 wherein visually altering comprises changing the color of the speed trend vector graphic to a caution color if the deceleration of the aircraft falls below the first deceleration threshold during landing of the aircraft.

17. The method of claim 15 further comprising:
establishing a second deceleration threshold at one or more junctures during landing of the aircraft; and
changing the color of the speed trend vector graphic to a warning color if the deceleration of the aircraft falls below the second deceleration threshold.

18. The method of claim 15 further comprising:
establishing a first acceleration threshold at one or more junctures during takeoff of the aircraft; and
changing the color of the speed trend vector graphic to a caution color if the acceleration of the aircraft falls below the first acceleration threshold.

19. The method of claim 18 further comprising:
establishing a second acceleration threshold at one or more junctures during takeoff of the aircraft; and
changing the color of the speed trend vector graphic to a warning color if the acceleration of the aircraft falls below the second acceleration threshold.

20. The method of claim 15 wherein the speed trend vector graphic is produced on the PFD when the aircraft speed remains constant over the predetermined time period to retain the ability to generate a visual alert of the low speed change condition by altering the appearance of the speed trend vector graphic.

* * * * *